2,996,597
IGNITING AND HEATING DEVICE FOR BARBECUES

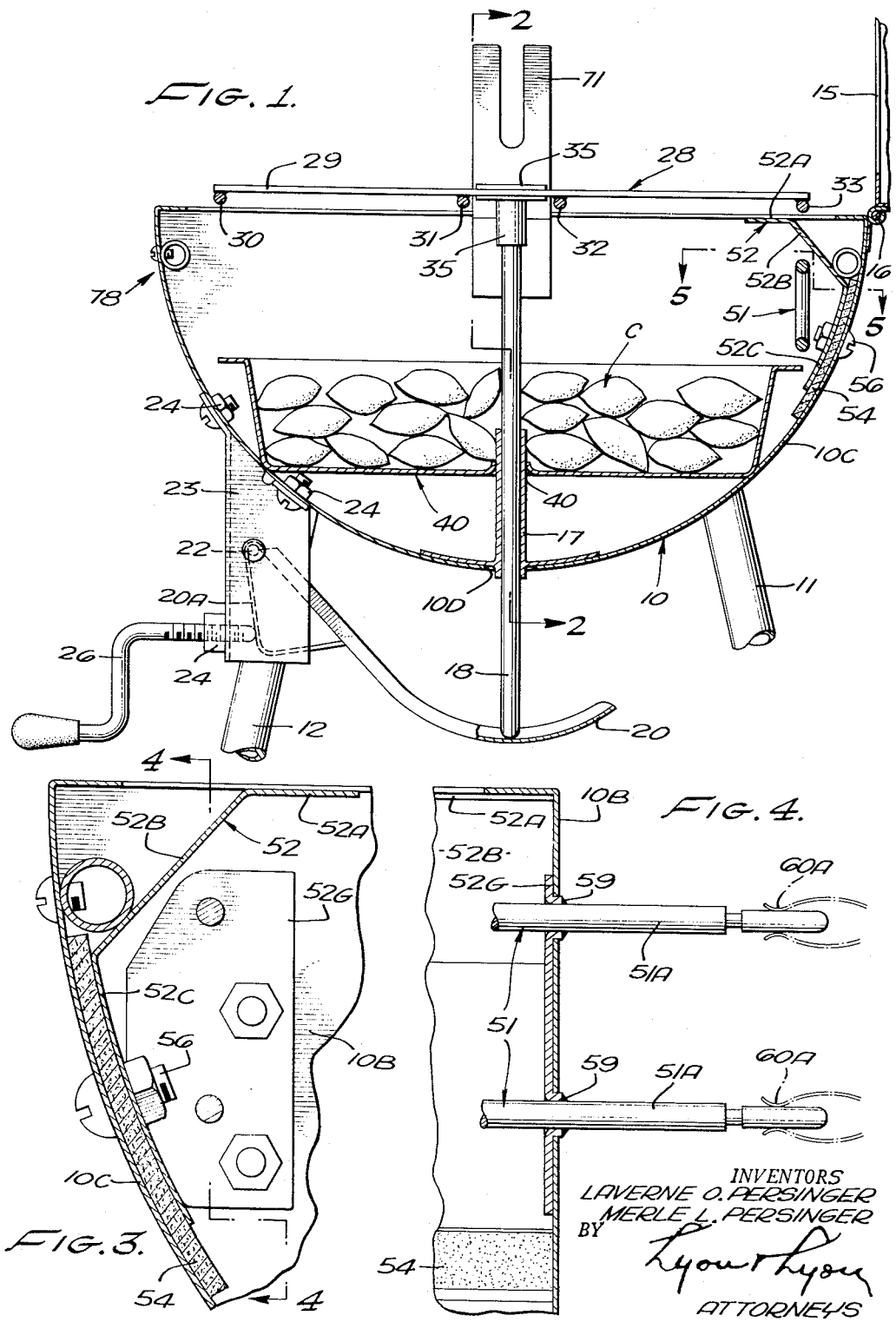

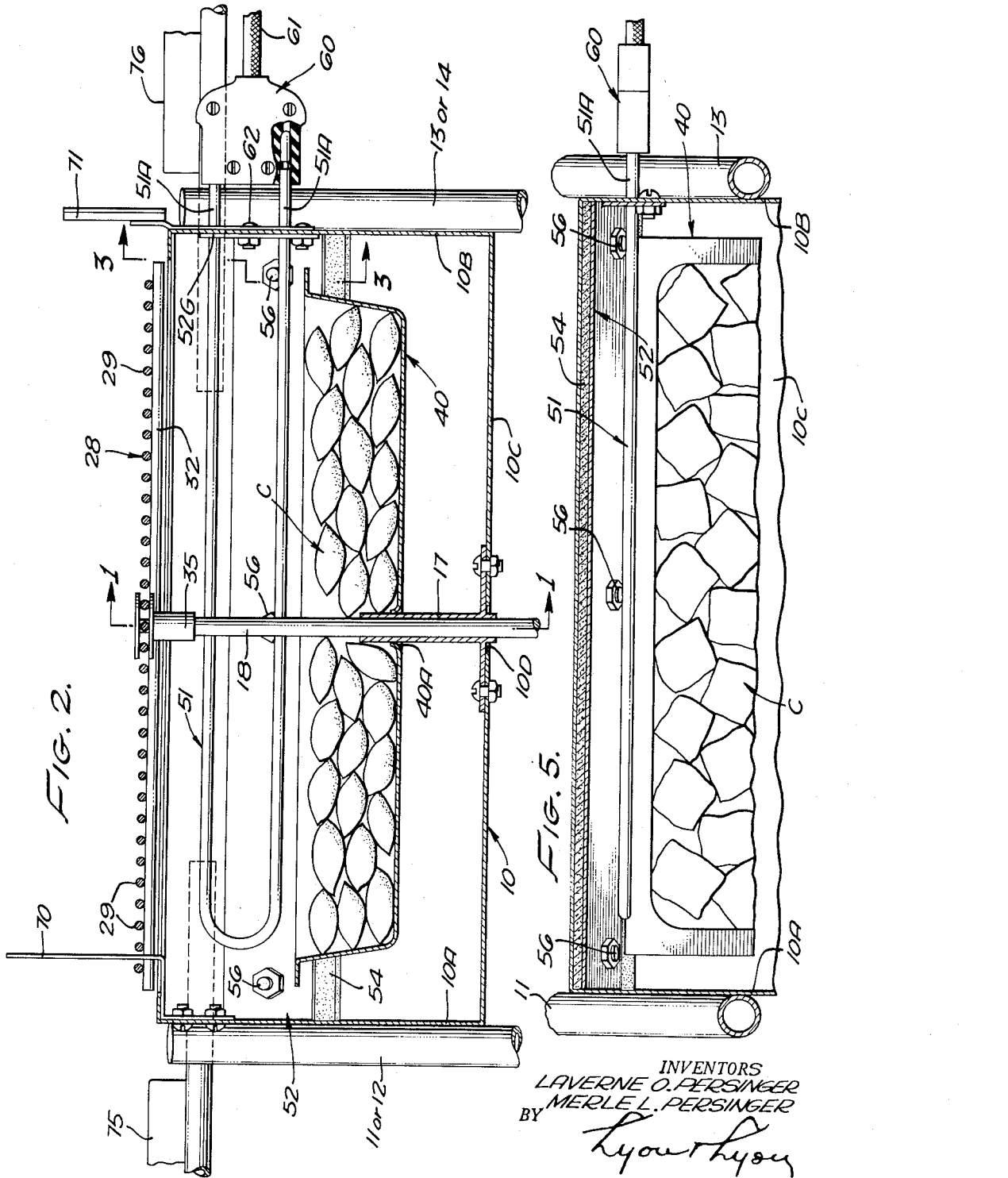

Laverne O. Persinger, Burbank, and Merle L. Persinger, Glendale, Calif., assignors to Big Boy Manufacturing Company, a division of Seidelhuber Steel Rolling Mill Corporation, Burbank, Calif., a corporation of Washington
Filed Sept. 22, 1959, Ser. No. 841,494
9 Claims. (Cl. 219—34)

The present invention relates to improved barbecue apparatus and particularly to novel charcoal barbecue apparatus that incorporates an electrical heater.

An object of the present invention is to provide improved barbecue equipment which incorporates an electrical heater so positioned with respect to the firebox and grill of charcoal burning equipment that the same may function either as a means for starting or aiding the starting of ignition of charcoal or like burnable material or as a means for supplying heat to a comestible on the grill of the equipment.

Another object of the present invention is to provide an arrangement for achieving the above results in a simple, expeditious and inexpensive manner.

Another object of the present invention is to provide improved barbecue equipment in which an electrical heater is associated in a novel manner with respect to the grill and firebox or bowl.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is generally a sectional view taken substantially on the line 1—1 of FIGURE 2.

FIGURE 2 is a sectional taken on the line 2—2 of FIGURE 1.

FIGURE 3 is a sectional view taken on the line 3—3 of FIGURE 2.

FIGURE 4 is a sectional view taken on the line 4—4 of FIGURE 3.

FIGURE 5 is a sectional view taken on the line 5—5 of FIGURE 1.

The barbecue apparatus shown in the drawings includes generally a semi-cylindrical sheet metal base or frame 10 mounted on four legs 11, 12, 13 and 14 with a lid member 15 hinged thereon. These legs 11, 12, 13 and 14 are metal tubes suitably fastened by bolting to the ends of the base 10, the legs 11, 12 being bolted to the base end 10A and the other two legs 13, 14 being bolted to the other base end 10B to suitably support the equipment on these four legs.

Preferably, the lid member 15 (FIGURE 1), which is hinged by means of piano-type hinge 16 to the rear upper edge of the base curved portion 10C, is also of semi-cylindrical shape which complements the semi-cylindrical shape of the base 10 so that when the same is closed, the base and lid form a barrel or closed cylinder.

The base 10 is centrally apertured at 10D to receive a portion of an elongated guide socket 17 in the form of a flanged sleeve, the flanged portion being suitably fastened by bolting or riveting, as shown in FIGURE 2, to the curved base portion 10C. An elongated lift pin 18 is slidably mounted in such socket 17 and has its lower end adjustably positioned and supported in the adjustable pin cradle 20. This cradle 20 is in the form of a cantilever which is pivotally mounted about the axis of the pivot pin 22, the pivot pin 22 being secured on a subframe 23 which is bolted by means of bolts 24 to the curved base wall 10C. This cradle 20 is sufficiently prolonged and has an extension 20A contacted by the end of an adjustable screw-threaded lever 26 which is threaded in a nut 27 welded to the subframe 23. Upon manual turning of this crank lever 26, the cradle 20 is pivoted about the axis of the pivot pin 22 to cause the lift pin 18 to be raised or lowered depending upon the direction of rotation of the crank 26. This movement of the pin 18 results from gravity forces acting thereon and particularly the gravity forces of the generally rectangular grill member 28 releasably secured on the upper end of pin 18.

The grill 28 comprises generally a series of parallel extending and spaced rods 29 suitably fastened together, for example, by welding to the four cross rods 30, 31, 32, 33. This grill 28 has secured thereto a conventional socket 35 which snugly receives the upper end of the lift pin 18 to releasably secure such grill 28 on the upper end of the lift rod 18.

It will be clear from the foregoing that upon rotation of the crank lever 26, the grill is raised or lowered depending upon rotation of the crank lever 26.

A generally rectangular firebox 40 is mounted within the base member 10, as shown in FIGURES 1 and 2, with two corners engaging the inner wall of the curved base portion 10C. Also, the firebox 40 is centrally apertured at 40A to snugly receive the upper end of the guide sleeve 17 to thereby assure a stable support of the firebox 40 within the base 10.

In accordance with an important feature of the present invention, there is mounted an electrical heating unit 51 within the base 10 and between the firebox 40 and the grill 28 for purposes of supplying heat either to a charcoal or other combustible fuel in the firebox 40 to aid in its ignition or, in the absence of such combustible fuel C, to supply heat to comestibles on the grill 28. For this purpose a suitable heat reflector 52 is mounted between the electrical heating unit 51 and the wall 10C of the base 10. This heat reflector 52 is suitably insulated from the metal base 10 by a generally rectangular layer of heat insulating material such as asbestos 54. This asbestos 54 is sandwiched between the reflector 52 and the base portion 10C by the three reflector-retaining bolts 56.

It should be observed carefully in FIGURE 1 that this reflector 52 has portions 52A and 52B, both of which are effective to reflect heat downwardly in the direction of the firebox 40 from the electrical heating unit 51; and also such reflector 52 has a portion 52C positioned to reflect heat from the unit 52 upwardly in the general direction of the grill 28. This reflector 52, having the cross-section illustrated in FIGURE 1, extends substantially the full width of the barbecue unit as illustrated in FIGURE 2.

The electrical heating unit 51 may be generally in the form commercially known as a Calrod unit which is, in this case, shaped generally in the form of an elongated hairpin to extend substantially the full width of the barbecue unit and the free ends of the unit 51 are secured, as shown in FIGURE 4, by welding or brazing 59 to apertured portions of the bent end 52G of reflector 52. This means that the reflector 52 and the heating unit 51 may be handled and assembled as a unit. The projecting ends 51A of the heating unit (FIGURE 4) are suitably formed as spaced terminals for electrical contact with a plug 60 of a conventional heating cord 61. This plug 60, as indicated in FIGURE 4, includes resilient electrical contact members 60A for assuring good contact with the inner conductor of the Calrod unit 51.

The base 10 may have bolted thereon accessories such as the standards 70 and 71 for rotatably supporting a spit assembly, the assembly 70 being adapted to rotatably receive in conventional manner the end of a spit and the standard of bracket 70 or 71 being adapted to releasably secure the spit driving motor. Also, the base 10 may support at opposite ends thereof the pair of tables 75 and 76 (FIGURE 2). For this purpose these tables may have tubes extending therefrom and such tubes extend through opposite end walls 10A, 10B of the base 10 and be bolted to the curved base portion 10C as illustrated at 78 in FIGURE 1.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. Barbecue equipment comprising a semi-cylindrical base member, a generally rectangular firebox supported within said base member, a grill member supported above said firebox and above said base member, an electrical heating unit mounted outside of said firebox near the upper edge of the base member adjacent an inner wall of said base member and extending substantially the full length of the base member, and heat reflecting means behind said electrical heating unit for directing heat in the direction of said firebox and said grill.

2. Barbecue equipment as set forth in claim 1 in which said electrical unit comprises an elongated heating unit in the form of two parallel legs interconnected by an integrally formed U-shaped portion.

3. Barbecue equipment as set forth in claim 2 in which said heating unit terminates in a male-type plug.

4. In barbecue equipment, a firebox, a support for said firebox, a grill mounted on said support above said firebox, and an electrical heating unit mounted on said support outside of said firebox between said firebox and said grill and outside of the verticle projection of said firebox.

5. Barbecue equipment as set forth in claim 4 including heat reflecting means behind said electrical heating unit.

6. Barbecue equipment as set forth in claim 5 in which said heat reflecting means functions to reflect heat from said heating unit not only in the direction of said firebox but also in the direction of said grill.

7. Barbecue equipment as set forth in claim 6 including means for adjustably supporting said grill with respect to said firebox and said electrical heating unit.

8. Barbecue equipment comprising a grill, means supporting said grill, a firebox supported on the last mentioned means, an electrical heating unit mounted on said supporting means outside of said firebox and out of the direct path of heat which is radiated from said firebox onto said grill, said electrical heating unit otherwise being disposed between said grill and said firebox.

9. An arrangement as set forth in claim 8 including heat reflecting means for reflecting heat from said electrical heating unit in the direction of said firebox as well as in the direction of said grill.

References Cited in the file of this patent

UNITED STATES PATENTS

| | | |
|---|---|---|
| 2,010,460 | McKinley | Aug. 6, 1935 |
| 2,187,888 | Nachumsohn | Jan. 23, 1940 |
| 2,812,706 | Del Francia et al. | Nov. 12, 1957 |
| 2,833,201 | Simank | May 6, 1958 |
| 2,833,906 | Wingo | May 6, 1958 |
| 2,866,883 | Borden | Dec. 30, 1958 |
| 2,903,549 | Joseph | Sept. 8, 1959 |